S. HILL.
Stove-Lid Lifters and Stands.

No. 153,488.            Patented July 28, 1874.

Witnesses          Inventor
Jno. L. Boone         Samuel Hill
C. M. Richardson     by Dewey & Co
                        Atty's

UNITED STATES PATENT OFFICE.

SAMUEL HILL, OF SAN FRANCISCO, CALIFORNIA.

IMPROVEMENT IN STOVE-LID LIFTERS AND STANDS.

Specification forming part of Letters Patent No. 153,488, dated July 28, 1874; application filed May 15, 1874.

*To all whom it may concern:*

Be it known that I, SAMUEL HILL, of San Francisco city and county, State of California, have invented a Combined Stove-Lid Lifter and Stand; and I do hereby declare the following description and accompanying drawings are sufficient to enable any person skilled in the art or science to which it most nearly appertains to make and use my said invention without further invention or experiment.

The object of my invention is to provide a convenient implement for lifting and handling stove-lids, and which will, at the same time, form a stand, by means of which the lid, when attached to it, can be held in an upright position, so that it can be placed upon a carpeted floor without soiling or marking it.

Figure 1:
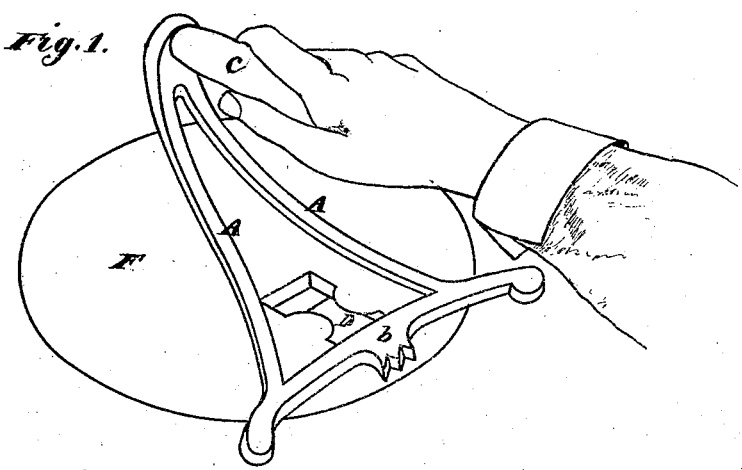
Figure 2:
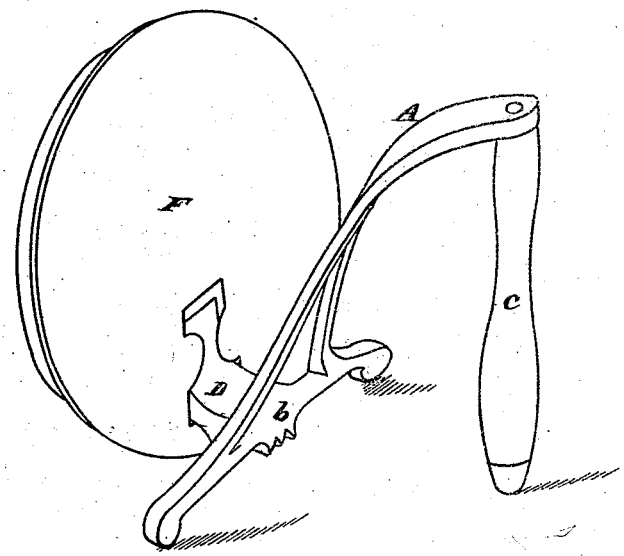
Figure 3:

In the drawings, Figure 1 represents the lifter and stand employed as a lid-lifter. Fig. 2 represents it as a stand, supporting the lid in an upright position. Fig. 3 is a perspective, showing the arrangement of the lifter and stand.

A is a metal bar or plate, having the horizontal bar or base $b$, at its lower end. The ends of the base $b$ are curved downward, so as to form feet, as shown. In the present instance the bar A is separated near its upper end into two parts, which are spread apart toward the lower end in the form of an A; but a single bar would suffice, and in some instances an ornamental bar will be used. The upper end of the bar A is bent or curved to one side, as shown, and a handle, C, is applied to it, so as to stand nearly parallel with the bar A. A hook, D, is formed on the horizontal bar or base $b$ at its middle, which curves outward and upward in the form of an ordinary lid-hook.

This implement is very convenient for lifting stove-lids from one place to another, in place of the ordinary stove-lid lifter. The handle provides a convenient means of grasping the implement, and when made of wood it will not be so liable to get hot as the metal handles. A shield could be applied between the handles and attached stove-lid, if desired, to prevent the hand from being burned by the heat of the lid.

Besides being an ordinary lid-lifter, when the lid F is lifted upon the hook, the stand can be set down upon a floor, shelf, or other place, so as to rest upon the feet of the base $b$ and end of the handle C, and thus support the lid in an upright position without allowing it to touch the floor or shelf, as shown at Fig. 2.

This implement will also be very useful and convenient for lifting pots from the stove, as the hook can be caught under the bail and the pot lifted without touching it with the hands.

A stove-lid lifter and stand having these advantages can be made of wire in a variety of forms, and at a small expense.

Having thus described my invention, what I claim, and desire to secure by Letters Patent, is—

A combined stove-lid lifter and stand, consisting of the bar A, base $b$, handle C, and hook D, or equivalent parts, arranged to operate substantially as above described.

In witness whereof I hereunto set my hand and seal.

SAMUEL HILL. [L. S.]

Witnesses:
JOHN L. BOONE,
C. M. RICHARDSON.